US012676771B2

(12) United States Patent (10) Patent No.: US 12,676,771 B2
Gerdes et al. (45) Date of Patent: Jul. 7, 2026

(54) CONTROLLER SIGNALING OF FLEXIBLE EVENT INDICATOR ANNUNCIATION

(71) Applicant: Caterpillar Inc., Peoria, IL (US)

(72) Inventors: Josenia Yuen-Sai Gerdes, Dunlap, IL (US); Anjaiah Unnam, Peoria, IL (US); Matthew Headley, Galesburg, IL (US); Edward M. Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 809 days.

(21) Appl. No.: 17/664,995

(22) Filed: May 25, 2022

(65) Prior Publication Data

US 2023/0388149 A1 Nov. 30, 2023

(51) Int. Cl.
H04L 12/40 (2006.01)

(52) U.S. Cl.
CPC .................. H04L 12/40013 (2013.01); H04L 2012/40215 (2013.01); H04L 2012/40273 (2013.01)

(58) Field of Classification Search
None
See application file for complete search history.

(56) References Cited

U.S. PATENT DOCUMENTS

| | | | |
|---|---|---|---|
| 6,553,336 B1 | 4/2003 | Johnson et al. | |
| 7,035,912 B2 | 4/2006 | Arteaga | |
| 7,966,379 B2 * | 6/2011 | Berenbaum | G06F 13/22 |
| | | | 714/48 |
| 9,791,520 B2 | 10/2017 | Witter et al. | |
| 11,614,725 B1 * | 3/2023 | Jarrett, Jr. | G08C 17/02 |
| | | | 700/17 |
| 2001/0009425 A1 | 7/2001 | Thomas | |
| 2003/0052770 A1 * | 3/2003 | Mansfield, Jr. | H04B 3/54 |
| | | | 340/506 |
| 2007/0152047 A1 * | 7/2007 | Tu | G06Q 10/087 |
| | | | 705/28 |
| 2009/0077055 A1 | 3/2009 | Dillon | |
| 2014/0303751 A1 | 10/2014 | Ibrahim | |
| 2017/0223159 A1 * | 8/2017 | Park | H04M 19/04 |
| 2018/0114414 A1 * | 4/2018 | Law | G08B 5/22 |

(Continued)

FOREIGN PATENT DOCUMENTS

| | | |
|---|---|---|
| JP | 4915659 B2 | 4/2012 |
| KR | 20040078269 A | 9/2004 |

(Continued)

OTHER PUBLICATIONS

Written Opinion and International Search Report for Int'l. Patent Appln. No.PCT/US2023/019177, mailed Jul. 27, 2023 (12 pgs).

*Primary Examiner* — Otis L Thompson, Jr.

(57) ABSTRACT

In some implementations, a controller may receive event information associated with one or more events associated with the system, wherein the event information indicates flexible event indicator annunciation information for respective events of the one or more events. The controller may configure the event information for the one or more events. The controller may transmit, to a display device, an event information message, associated with an event of the one or more events, that includes flexible event indicator annunciation information, associated with the event, to be displayed by the display device when the event is active.

20 Claims, 5 Drawing Sheets

(56) References Cited

U.S. PATENT DOCUMENTS

| | | | | |
|---|---|---|---|---|
| 2018/0244399 | A1* | 8/2018 | Karunakar | G06F 16/635 |
| 2020/0160622 | A1* | 5/2020 | Aquila | G01R 31/3835 |
| 2021/0135489 | A1 | 5/2021 | Stites-Clayton et al. | |
| 2023/0153189 | A1* | 5/2023 | Xiu | G06F 11/0721 |
| | | | | 714/57 |
| 2024/0168897 | A1* | 5/2024 | Lee | G06F 13/1694 |

FOREIGN PATENT DOCUMENTS

| | | | |
|---|---|---|---|
| WO | 2003049248 | A2 | 6/2003 |
| WO | 2018156137 | A1 | 8/2018 |

\* cited by examiner

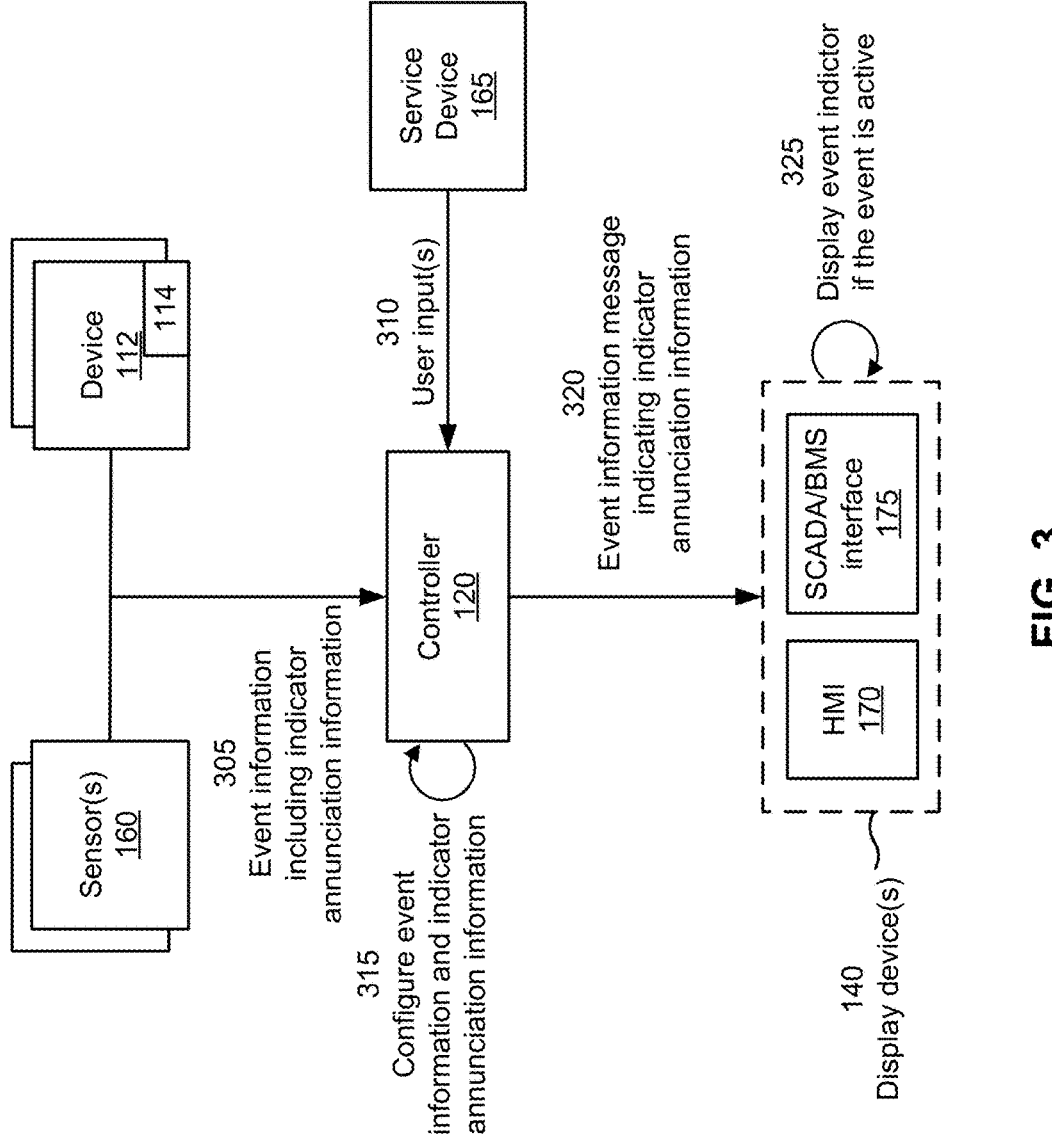

300

Sensor(s) 160

Device 112
114

305
Event information including indicator annunciation information

Service Device 165

310
User input(s)

315
Configure event information and indicator annunciation information

Controller 120

320
Event information message indicating indicator annunciation information

HMI 170

SCADA/BMS interface 175

325
Display event indictor if the event is active

140
Display device(s)

FIG. 3

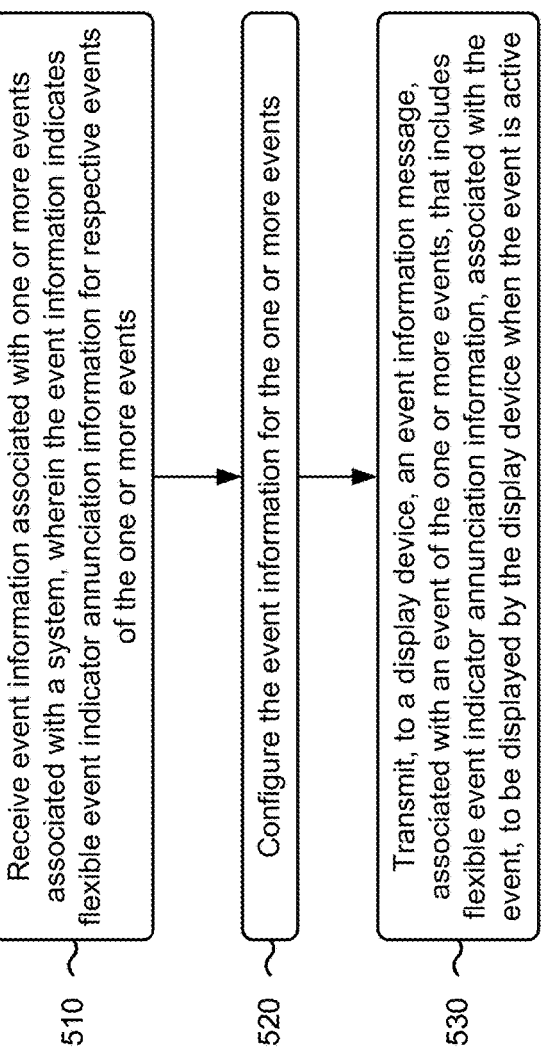

500

510 Receive event information associated with one or more events associated with a system, wherein the event information indicates flexible event indicator annunciation information for respective events of the one or more events 520 Configure the event information for the one or more events 530 Transmit, to a display device, an event information message, associated with an event of the one or more events, that includes flexible event indicator annunciation information, associated with the event, to be displayed by the display device when the event is active

FIG. 5

CONTROLLER SIGNALING OF FLEXIBLE EVENT INDICATOR ANNUNCIATION

TECHNICAL FIELD

The present disclosure relates generally to controllers associated with controlling or monitoring a system and, for example, to controller signaling of flexible event indicator annunciation information.

BACKGROUND

Controllers are often utilized to control, monitor, and/or provide information associated with a system. For example, a controller may monitor a status associated with one or more devices associated with the system. The controller may detect whether various events are active or conditions associated with an event are satisfied based on monitoring the data associated with the one or more devices. The controller may cause an event indicator (e.g., an optical indicator which may be referred to as a lamp) to be displayed via a display device to notify an operator that the event is active. An event indicator may also be referred to as an event lamp. For example, the controller may cause a region of the display device to display a color indicating a severity of the event (e.g., to notify the operator and enable the operator to take appropriate action(s) based on the event being active). For example, events requiring immediate operator action may be annunciated using a first color (e.g., red), whereas events not requiring immediate operator action may be annunciated using a second color (e.g., orange). Annunciation information (e.g., indicating colors or other information to be displayed by the display device) may be predefined and stored by the controller. The display device may be associated with, or included with, the controller. Therefore, the controller may use internal signaling to cause the display device to display various event indicators.

However, in some cases, the display device may be separate from the controller. For example, third party displays or other devices may be used to display the various event indicators. Therefore, the internal signaling protocol may not be used to transmit annunciation information for the various events. Moreover, the annunciation information may be dynamic and/or change over time. However, the controller may be unable to communicate the annunciation information for the various events to the separate display device because no signaling protocol is defined for indicating the annunciation information. Therefore, the controller may be unable to transmit an indication of the annunciation information and/or the separate display device may be unable to receive or interpret an indication of the annunciation information.

U. S. Patent Application Publication No. 2021/0135489 (the '489 publication) discloses a connected, intelligent transfer switch system that permits remote metering, monitoring and control of energy sources connected to a device both by hardwired and wireless connection, that addresses rigid operational logic by enabling flexibility and intelligent decision-making capabilities through a connectivity platform and a cloud software infrastructure that provides a remote interface for users to interact with a switching system. By including a dedicated and integrated connection to the internet, the '489 publication discloses a system that ensures that operational logic is not constrained by information accessible only within the context of a single switch device.

However, the '489 publication does not define a protocol, format, or signaling for communicating event indicator annunciation information between a controller and a display device. The controller of the present disclosure solves one or more of the problems set forth above and/or other problems in the art.

SUMMARY

Some implementations described herein relate to a method. The method may include receiving, by a controller that is associated with controlling a system, event information associated with one or more events associated with the system, wherein the event information indicates flexible event indicator annunciation information for respective events of the one or more events. The method may include configuring, by the controller, the event information for the one or more events. The method may include transmitting, by the controller and to a display device, an event information message, associated with an event of the one or more events, that includes flexible event indicator annunciation information, associated with the event, to be displayed by the display device when the event is active.

Some implementations described herein relate to a controller associated with controlling a system. The controller may be associated with controlling a system. The controller may include one or more memories and one or more processors. The one or more processors may be configured to obtain event information associated with one or more events associated with the system, wherein the event information indicates event indicator annunciation information for respective events of the one or more events, and wherein the event indicator annunciation information indicates an event indicator color. The one or more processors may be configured to configure diagnostic messaging information for the one or more events including the event indicator annunciation information. The one or more processors may be configured to transmit, to a display device, an internet protocol suite communication protocol event log message indicating event information associated with an event of the one or more events, wherein the internet protocol suite communication protocol event log message includes an indication of event indicator annunciation information for the event.

Some implementations described herein relate to a system. The system may include one or more system devices and a controller for controlling the one or more system devices. The controller may be configured to receive event information associated with one or more events associated with the system, wherein the event information indicates flexible event indicator annunciation information for respective events of the one or more events. The controller may be configured to transmit, to a display device, an event information message, associated with an event of the one or more events, that includes flexible event indicator annunciation information, associated with the event, to be displayed by the display device when the event is active.

BRIEF DESCRIPTION OF THE DRAWINGS

FIG. 3 is a diagram of an example of signaling associated with flexible event indicator annunciation information described herein.

FIG. 5 is a flowchart of an example process associated with controller signaling of flexible event indicator annunciation described herein.

DETAILED DESCRIPTION

This disclosure relates to a controller, which is applicable to any controllable machine or system. The controller has universal applicability to any machine, machines, or system utilizing such a controller. "Machine" may refer to any machine that performs an operation associated with an industry such as, for example, mining, construction, farming, transportation, fracturing, or any other industry. As some examples, the machine may be a generator system, a generator set (genset), a vehicle (e.g., a land-based vehicle or marine vehicle), and/or a fracture rig, among other examples. Moreover, one or more implements and/or systems may be connected to the machine and/or controlled by the controller.

Figure 1:
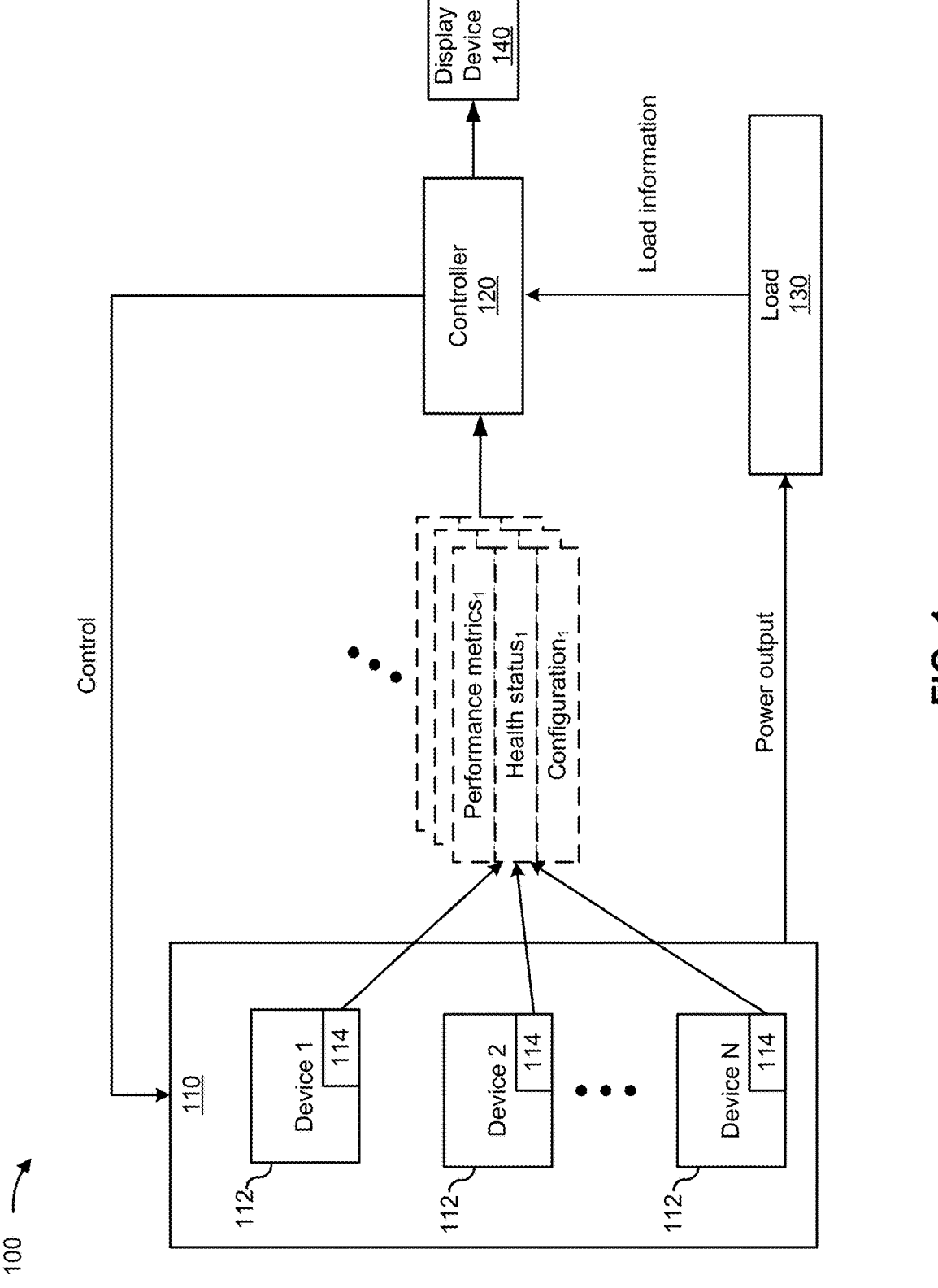
FIG. 1 is a diagram of an example system described herein.

FIG. 1 is a diagram of an example system 100 described herein. The system 100 of FIG. 1 includes device system 110 with a plurality of devices 112 (shown as engine 1 to engine N, where N is an integer and N>1) and corresponding control modules (CMs) 114, a controller 120, and a load 130. The plurality of devices 112 may be referred to herein collectively as "devices 112" or individually as "device 112." As shown and described herein, the controller 120 may control devices 112 of device system 110 to provide mechanical and/or electrical power to load 130.

In some implementations, the plurality of devices 112 may be a plurality or set of generators (e.g., which may be referred to as a "generator set" or "genset") configured to provide electrical power to a load. For example, the system 100 may be a genset system. As described herein, one or more of devices 112 may include a compression ignition, internal combustion engine. Additionally, or alternatively, one or more of devices 112 may include any other type of internal combustion engine, such as, for example, a spark, laser, or plasma ignition engine. Devices 112 may be fueled by distillate diesel fuel, biodiesel, dimethyl ether, gaseous fuels, such as hydrogen, natural gas, propane, alcohol, ethanol, and/or any combination thereof. In other examples, the devices 112 may be vehicles, drills, building equipment, robots, motors, pumps, and/or other devices configured to be controller by the controller 120. In examples where the device 112 is an engine, the CM 114 may be an engine CM (ECM).

In some implementations, each of the devices 112 may be a same type of device. For example, all devices 112 may be made by a same manufacturer, be a same model, be configured to output a same amount of maximum power and/or torque, be configured to operate in a same manner, and/or the like. In some implementations, one or more of the devices 112 may be a different type relative to another device 112. In such cases, a first device 112 may be a first type of device configured to output a first amount of maximum power, and a second device 112 may be a second type of device configured to output a second amount of maximum power that is different from the first amount of maximum power. Furthermore, the devices 112 may be made by a different manufacturer and/or be a different model of device.

CMs 114 include one or more devices that provide corresponding control of devices 112 based on power control information from the controller 120. In some implementations, the CM 114 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), and/or another type of processing component. The processor is implemented in hardware, firmware, or a combination of hardware and software. The CM 114 may include one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by the CM 114. The CM 114 may include a memory (e.g., a non-transitory computer-readable medium) capable of storing instructions, that when executed, cause the processor to perform one or more processes and/or methods described herein.

The CM 114 may execute the instructions to perform various control functions and processes to control devices 112 according to instructions from the controller 120. CM 114 may include any appropriate type of control system configured to perform control functions such that devices 112 may operate properly. Further, the CM 114 may also control another system of a vehicle or machine, such as a transmission system, a hydraulic system, and/or another system.

The controller 120 includes one or more devices that provide control information to control an output (e.g., a power output or another output) from device system 110. The controller 120 may use the control information to cause the CMs 114 to control respective amounts of power that are provided from devices 112 to load 130. The controller 120 may be implemented as a processor, such as a programmable logic controller (PLC), CPU, an APU, a microprocessor, a microcontroller, a DSP, a FPGA, an ASIC, or another type of processing component. The processor may be implemented in hardware, firmware, or a combination of hardware and software. The controller 120 may include one or more processors capable of being programmed to perform a function. One or more memories, including a RAM, a ROM, and/or another type of dynamic or static storage device (e.g., a flash memory, a magnetic memory, and/or an optical memory) may store information and/or instructions for use by the controller 120. The controller 120 may include a memory (e.g., a non-transitory computer-readable medium) capable of storing instructions, that when executed, cause the processor to perform one or more processes and/or methods described herein.

The controller 120 may execute the instructions to perform various control functions and processes to cause CMs 114 to control devices 112 based on load information and/or one or more parameters or one or more metrics of the device system 110. The controller 120 may include any appropriate type of control system configured to perform optimization functions, prioritization functions, and/or power control functions.

In operation, the controller 120 may execute computer software instructions to perform various control functions and processes to control the device system 110, to monitor events associated with the devices 112, to communicate event indicator annunciation information, and/or to perform other operations as described herein. For example, the controller 120 may monitor and/or receive information associated with one or more metrics associated with the devices 112. As shown in FIG. 1, the one or more metrics may include performance metrics (e.g., fuel consumption rate, emission maps, engine speed, efficiency, power output, and/or the like), a real time on-board health status (e.g., a total usage, a life expectancy, component failure monitor, next required or scheduled maintenance, and/or the like), and/or a device configuration (e.g., whether two or more of devices 112 are mechanically coupled to one another to operate together) of devices 112, among other examples. A real time on-board health status may be input by one or more physics-based models running in CMs 114. The controller 120 and/or the CMs 114 may calculate and/or determine the one or more metrics based on the one or more parameters measured by monitoring devices and/or sensors that are communicatively coupled with the CMs 114 and/or the controller 120.

The controller 120 may communicate with the CMs 114 and/or other controllers via a data link. For example, the data link may be a Controller Area Network (CAN) communication link, a transmission control protocol (TCP)/Internet Protocol (IP) (TCP/IP) communication link, an internet protocol suite communication link, a MODBUS communication link, an Ethernet data link, an Ethernet user data protocol (Ethernet UDP) communication link, or another suitable data link that enables peer-to-peer communications between controllers (e.g., without a host computer or host device). In some implementations, the data link may be associated with a serial communication protocol (e.g., a MODBUS serial communication protocol) to enable communications between controllers.

The controller 120 may cause information to be displayed via a display device 140. The display device 140 may be any device capable of displaying information, images, video, optical indicators, lamps, or other system information associated with the system 100. For example, the display device may be, or may include, a human-machine interface (HMI), a user interface, a graphical user interface (GUI), a display screen, a light emitting diode (LED) screen, a liquid crystal display (LCD) screen, a touch screen, a supervisory control and data acquisition (SCADA) device, a building management system (BMS) display interface, a computer, or another device capable of displaying information as described herein. In some aspects, the display device 140 may be separate from the controller 120 and/or the system 100. For example, the display device 140 may be optional equipment that is installed separately from the other devices or components associated with the system 100. The display device 140 may receive information associated with event indicator annunciations, to be displayed by the display device 140, from the controller 120, as described in more detail elsewhere herein.

As indicated above, FIG. 1 is provided as an example. Other examples may differ from what is described with regard to FIG. 1.

Figure 2:
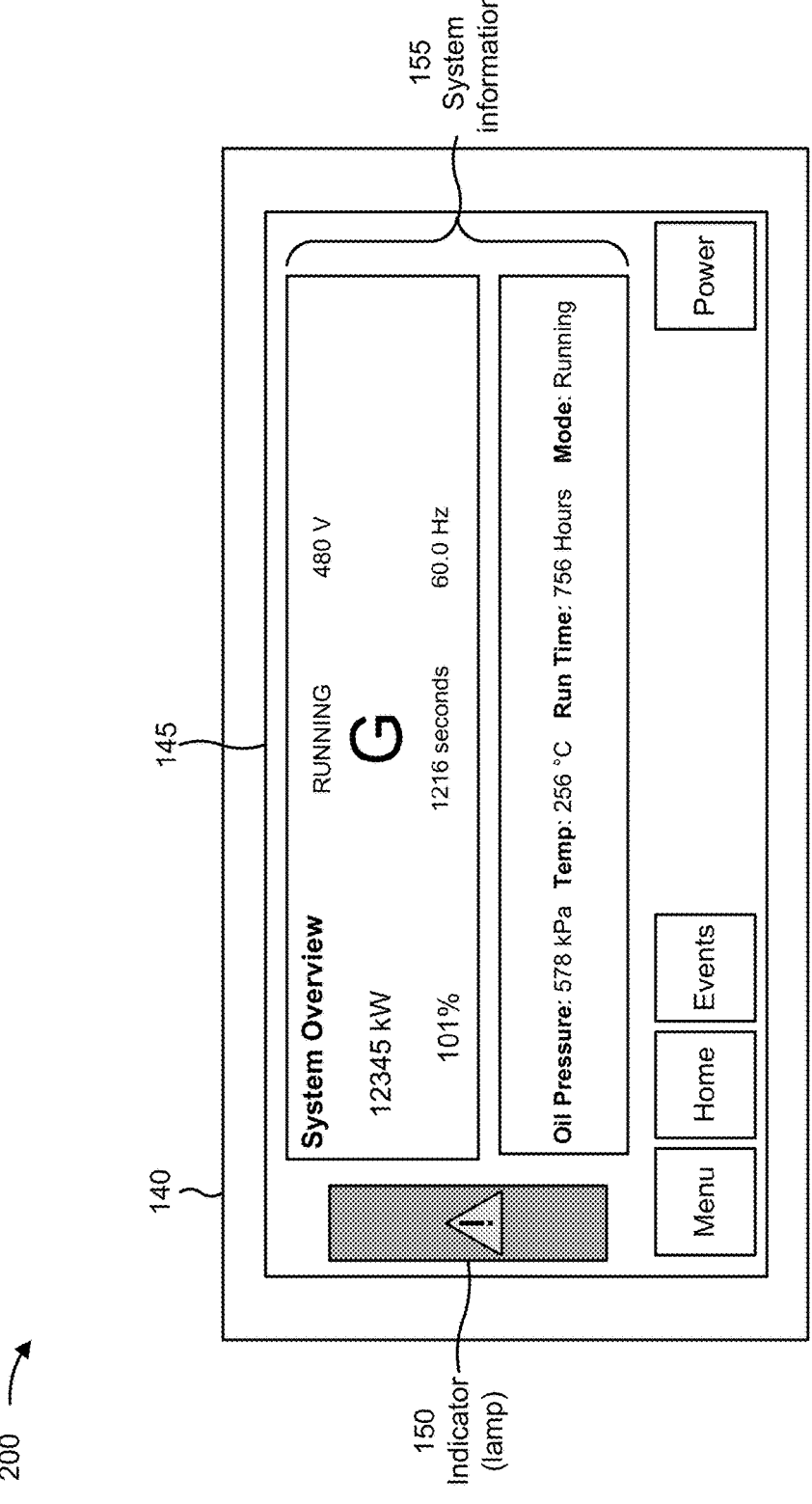
FIG. 2 is a diagram of an example display screen of a display device described herein.

FIG. 2 is a diagram of an example display screen of the display device 140 described herein. For example, the display device 140 may include a display 145. The display 145 may be a device capable of displaying information, as described herein. The display 145 may be an operator panel, a control panel, an HMI panel, a screen, a GUI, a touch screen, an HMI, an LED display, an LCD display, and/or another display.

The display device 140 and/or the display 145 may include an indicator 150. The indicator 150 may be referred to herein as an event indicator and/or a lamp, among other examples. The indicator 150 may be an optical indicator, displayed by the display device 140, associated with one or more events. For example, the indicator 150 may be associated with a region of the display 145 of the display device

140. The region of the display 145 may be an area or region of a screen or may be a light, lamp, and/or bulb configured on the display 145, among other examples. The display device 140 may cause the indicator 150 to display various colors, images, and/or optical patterns when an event is active. For example, if the display device 140 receives an indication (e.g., from the controller 120) that an event is active, the display device 140 may display an annunciation (e.g., a notification or an announcement) of the event via the indicator 150. For example, annunciation information associated with the event may indicate a color, an image, a sound, and/or an optical pattern (e.g., a pattern of lights, colors, and/or blinking lights, among other examples), among other examples, is to be output by the display device 140 (e.g., via the display 145, the indicator 150, a speaker, and/or another component of the display device 140) when the event is active or occurring. For example, the display device 140 may cause the indicator 150 to display a color indicating a severity of an active event to an operator viewing the display 145. For example, for a first category of events that may require immediate system shutdown or operator intervention, the display device 140 may cause the indicator 150 to display a color indicating a severe event is active, such as red. For a second category of events that may not require immediate operator intervention, the display device 140 may cause the indicator 150 to display a color indicating a severe event is active, such as orange, yellow, or amber. For a third category of events that may not require any operator intervention, the display device 140 may not cause the indicator 150 to display any color (or to display a default color) when an event in the third category of events is active or occurring. Therefore, the indicator 150 may enable the display device 140 to notify or alert an operator that an event is occurring and to indicate a severity or seriousness of the event to the operator based on the annunciation information associated with the event. The operator may then be enabled to take appropriate action based on the event that is active.

Additionally, the display device 140 and/or the display 140 may cause system information 155 to be displayed. The system information 155 may include operational information, configuration information, sensor readings, measurements, performance metrics, health status, a life expectancy, runtime information, whether maintenance is needed, whether a failure has occurred or is about to occur, and/or other information associated with the system 100. For example, as shown in FIG. 2, the system information 155 may include a power output (e.g., 12345 kilowatts), an amount of time that the system 100 or devices 112 have been running (e.g., 1216 seconds), a voltage measurement (e.g., 480 volts), a frequency measurement (e.g., 60.0 hertz), an oil pressure of one or more devices 112 (e.g., 578 kilopascals), a temperature associated with one or more devices 112 (e.g., 256 degrees Celsius), an overall run time of the system 100 and/or one or more devices 112 (e.g., 756 hours), and/or an operation mode of the system 100 and/or one or more devices 112 (e.g., running), among other examples. The display 145 may also include one or more user input options (e.g., "Menu," "Home," "Events," and/or "Power") to enable the operator to navigate to various screens and/or to view other information associated with the system 100.

As indicated above, FIG. 2 is provided as an example. Other examples may differ from what is described with regard to FIG. 2.

FIG. 3 is a diagram of an example 300 of signaling associated with flexible event indicator annunciation information described herein. The components and/or devices shown in FIG. 3 may be included in, or be associated with, the system 100. As shown in FIG. 3, the display device 140 may include an HMI 170 and/or a SCADA or BMS interface 175, among other examples.

The system 100 may include one or more sensors 160. A sensor 160 may include one or more cameras, one or more microphones, one or more Internet of Things (IoT) devices, one or more physical sensors (e.g., a vibration sensor, a speed sensor, a fuel sensor, a pressure sensor, a temperature sensor, a pyrometer, an air sensor, and/or the like), and/or any appropriate type of monitoring device that generates values for parameters based on a computational model and/or one or more measured parameters. As used herein, parameters may refer to measurement parameters that are directly measured and/or estimated by one or more sensors (e.g., physical sensors, virtual sensors, and/or the like). Parameters may also include any output parameters that may be measured indirectly and/or calculated, based on readings of physical sensors, by sensor(s) 160, a CM 114, and/or the controller 120, among other examples. Measurements and/or information from a sensor 160 may refer to any values or information relevant to the one or more parameters and indicative of the state of devices 112. For example, measurements may include machine and environmental parameters, such as temperature values, pressure values, ambient conditions, fuel rates, engine speeds, vibrations and/or oscillations (which may be determined from vibration sensors, cameras, and/or microphones), usage time, usage rate, total power output, and/or the like.

The one or more parameters associated with the sensor(s) 160 may be used to calculate and/or determine metrics (e.g., performance metrics, health status, and/or the like) of a device 112. For example, to determine the health status (e.g., a life expectancy, whether maintenance is needed, whether a failure has occurred or is about to occur, and/or the like), a vibration sensor, camera, and/or microphone of a sensor 160 of a device 112 may determine that the device 112 is experiencing an unusual amount of structural weakness (e.g., the vibration sensors sense vibrations, images from the camera detect unusual physical movement or repositioning of the device 112, the microphone captures audio indicating movement or a lack of structural integrity of the device 112, among other examples). Accordingly, based on the information from the sensor 160, the controller 120 (and/or a CM 114) may determine that the device 112 needs maintenance or may need maintenance within an upcoming time period (which may depend on the severity of the vibration, movement, and/or noises detected).

For example, based on the information from a sensor 160 or another device, the controller 120 may determine that an event is active or occurring. For example, the controller 120 may determine that a measurement value satisfies a threshold, may determine that a device 112 requires maintenance (e.g., based on a vibration sensor measurement, a camera image, and/or other information), and/or may determine that an output (e.g., a power output, an amperage output, and/or a voltage output) of the system 100 or the device system 110 satisfies or does not satisfy a threshold (e.g., a maximum or minimum output value), among other examples.

Based on determining that an event is active or occurring, the controller 120 may perform one or more actions to cause the display device 140 to display an annunciation of the event (e.g., via the indicator 150). However, as described elsewhere herein, the annunciation information associated with the event (e.g., what color, optical pattern, and/or sound, among other examples, is to be output by the display device 140) may change over time. Additionally, the display device 140 may be a separate device from the controller 120 and/or the system 100. Therefore, the controller 120 may need to signal annunciation information associated with various events to the display device 140 from time to time.

As shown by reference number 305, the one or more sensors 160, the devices 112, and/or the CMs 114 may transmit, and the controller 120 may receive, event information associated with an event. The event information may include event indicator (e.g., indicator 150) annunciation information. For example, the annunciation information may indicate a manner in which the indicator 150 is to be displayed by the display device 140 when the event is active (e.g., a color and/or an optical pattern to be displayed by the indicator 150). For example, the controller 120 may receive, from a device (e.g., a sensor 160, a device 112, and/or a CM 114) associated with the system 100 and the event, an indication of flexible event indicator annunciation information associated with the event. The device (e.g., a sensor 160, a device 112, and/or a CM 114) may transmit the flexible event information via a CAN message. For example, the device (e.g., a sensor 160, a device 112, and/or a CM 114) may transmit event information associated with an event in accordance with a CAN communication protocol. For example, a higher-layer protocol based on CAN may be defined by a standards body, such as the Society of Automotive Engineers (SAE). For example, a sensor 160, a device 112, and/or a CM 114 may communicate with the controller 120 using a message format defined by the SAE, such as by a J1939 protocol. For example, a sensor 160, a device 112, and/or a CM 114 may communicate with the controller 120 to indicate event annunciation information for a diagnostic message (DM) format defined by the SAE J1939 protocol, such as the DM31 format. For example, the sensor 160, the device 112, and/or the CM 114 may report or broadcast annunciation information associated with an event to the controller 120 via a CAN message (e.g., a J1939 DM), as described above.

In some cases, as shown by reference number 310, the controller 120 may receive a user input indicating flexible event indicator annunciation information associated with an event. For example, the controller 120 may receive the user input from a service device 165 or another device. The service device 165 may include a communication device and/or a computing device. For example, the service device 165 may include a wireless communication device, a laptop computer, a tablet computer, a desktop computer, or a similar type of device. For example, the controller 120 may store an event configuration (e.g., an event response configuration) indicating event indicator annunciation information associated with various events. The event configuration may be pre-configured and/or may be an original equipment manufacturer (OEM) configuration (e.g., event information or annunciation information associated with the event configuration may be predefined). In some cases, a user (e.g., an end user of the system 100) may modify or change the event configuration. For example, the user may utilize the service device 165 to access information associated with the event configuration stored by the controller 120. The user may input modified annunciation information associated with one or more events to the service device 165. For example, the user may modify actions to be taken by the controller 120 when an event is active, occurring, and/or detected. In some cases, the user may modify annunciation information associated with the event (e.g., in the event configuration) to change a color or optical pattern that is to be displayed via the indicator 150 of the display device 140 when the event is active or detected.

As a result, the event information associated with an event may be flexible in that the annunciation information is capable of changing over time. For example, a user input may modify the annunciation information associated with an event. As another example, an additional device 112, sensor 160, or other device may be added to the system 100 after the system 100 has been configured and/or installed. The additional device may be associated with a new event and/or new annunciation information (e.g., that may be provided to the controller 120 via a CAN message or via the service device 165). Therefore, the controller 120 may need to update and/or change annunciation information associated with an event and/or add new annunciation information for a new event. Such changes or modifications may need to be signaled to the display device 140, as described herein.

As shown by reference number 315, the controller 120 may configure event information and/or event indicator annunciation information for one or more events associated with the system 100. For example, the controller 120 may configure diagnostic messaging information for the one or more events including event indicator annunciation information (e.g., diagnostic event indicator annunciation information) for one or more events. For example, as described above, the controller 120 may receive event indicator annunciation information for the one or more events via different communication protocols, different communication links, and/or from different devices. Therefore, the controller 120 may aggregate the event information and/or the event indicator annunciation information received via various communication protocols and/or from various devices into event logs associated with the events. Because the controller 120 is capable of communicating via the various communication protocols and/or with the various devices, the controller 120 may be enabled to collect the event annunciation information for one or more events and store the event annunciation information in a data structure and/or in a data format that can be read and/or interpreted by display devices, such as the display device 140. For example, in some cases, the controller 120 may receive event annunciation information associated with an event. The controller 120 may extract the event annunciation information and may store the event annunciation information in the data structure and/or in a data format that can be read and/or interpreted by display devices, as described herein.

For example, in some cases, the controller 120 may store event annunciation information associated with one or more events in one or more event logs. The event logs may use a format and/or data structure associated with, or defined by, an internet protocol suite communication protocol (e.g., a TCP/IP communication protocol). For example, the event logs may use a format and/or data structure that can be read and/or interpreted by devices that are capable of communicating via the internet protocol suite communication protocol (e.g., the TCP/IP communication protocol). For example, the internet protocol suite communication protocol and/or the TCP/IP communication protocol may be the MODBUS protocol. Therefore, the controller 120 may collect and/or aggregate the event annunciation information associated with one or more events (e.g., over time as the event annunciation information may change and/or be updated) and may store the event annunciation information in a format that can be read and/or interpreted by display devices (e.g., that are capable of communicating via the internet protocol suite communication protocol, such as the MOD-BUS protocol).

As shown by reference number 320, the controller 120 may transmit, and one or more display devices 140 may receive, an event information message indicating event indicator annunciation information associated with an event. For example, the controller 120 may transmit an event information message, associated with an event of the one or more events, that includes flexible event indicator annunciation information (e.g., an event indicator color, an optical pattern, a sound, a status, or other indicators), associated with the event, to be displayed or output by the display device 140 when the event is active. The controller 120 may transmit the event information message via a data link, such as an Ethernet link or a TCP/IP link.

The controller 120 may transmit the event information message periodically (e.g., based on a periodic schedule) and/or based on detecting a trigger event. The trigger event may include the controller 120 detecting that an event status has changed (e.g., between an active status and an inactive status), the controller 120 detecting that a new event being configured or received by the controller 120, and/or the controller 120 detecting a modification or change to event information (e.g., to event indicator annunciation information associated with the event), among other examples.

The event information message may be an internet protocol suite communication protocol event log message (e.g., a TCP/IP event log message or a MODBUS protocol event log message) indicating event information associated with the event. For example, the event information message may be associated with an internet protocol suite communication protocol message format (e.g., a MODBUS message format) that is defined for providing the event information associated with the event. In other words, the event annunciation information (e.g., indicating a color or optical pattern to be displayed via the indicator 150) may be included in a message that is defined for providing the event information associated with the event (e.g., defined by the MODBUS protocol). This may simplify the dynamic and/or flexible indications of the event annunciation information because a display device may already be capable of, or configured to, receive, decode, and/or otherwise interpret messages using formats defined by the internet protocol suite communication protocol (e.g., the MODBUS protocol).

The event indicator annunciation information (e.g., an indicator status or color or a lamp status or color) may be included in a register of the event information message format that is associated with indicating a status flag or occurrence count. For example, the message that is defined for providing the event information (e.g., the event log message) associated with the event may include information associated with the event's date, timestamp, occurrence, active or inactive status. The controller 120 may also include event indicator annunciation information (e.g., lamp status) associated with the event in the event information message (e.g., the event log message) in addition to the other event information. For example, the message format may include one or more registers (e.g., where a register is a 16-bit pieces of data) defined for providing various information associated with a given event. The controller 120 may include event indicator annunciation information in the register that is associated with indicating a status flag or occurrence count (e.g., a register 10 of the MODBUS event entry structure). For example, the event indicator annunciation information for the event may be included in one or more unused fields of the structure or format defined by the MODBUS protocol for the event log messages. For example, the controller 120 may use one or more bits (e.g., that are currently unused in the of the structure or format defined by the MODBUS protocol for the event log messages) associated with conveying the event indicator annunciation information. As an example, a first bit may be associated with indicating that a first color (e.g., red) is to be displayed by the indicator 150 when the event is active, a second bit may be associated with indicating that a second color (e.g., yellow or amber) is to be displayed by the indicator 150 when the event is active, and a third bit may be associated with indicating that no color, or a default color, is to be displayed by the indicator 150 when the event is active. For example, if the event indicator annunciation information indicates that the display device 140 is to display a color of red via the indicator 150 when the event is active, then the first bit may be associated with a value of "1," and the second and third bits may be associated with a value of "0" in the event information message (e.g., the event log message).

The event information message (e.g., the internet protocol suite communication protocol event log message) may indicate event indicator status or color, for the event, as defined by a DM format. For example, the controller 120 may indicate the event indicator status or color, for the event, in a MODBUS event log message in the same, or similar, manner as the event indicator status or color as defined by the SAE J1939 protocol (e.g., for the DM31 message format). This may ensure a consistent format for indicating event indicator status or color (e.g., lamp status or color) as received and/or broadcast between the controller 120 and the various devices of the system 100 (e.g., the sensor(s) 160, the devices 112, the CMs 114, and/or the service device 165) and as transmitted to the display device(s) 140.

As described above, the controller 120 may periodically, and/or based on detecting a trigger event, update event indicator annunciation information for various events to enable the display device(s) 140 to display correct annunciations (e.g., via the indicator 150) for the various events. For example, the controller 120 may receive a user input modifying the event indicator annunciation information for the event to different diagnostic event indicator annunciation information (e.g., as described in connection with reference number 315). The controller 120 may transmit, to the display device(s) 140, another internet protocol suite communication protocol event log message indicating the different event indicator annunciation information for the event, as described above.

The display device(s) 140 may parse the event information message (e.g., the event log message) to identify the event indicator annunciation information associated with the event. The display device(s) 140 may store the event indicator annunciation information to enable the display device(s) 140 to display the correct color and/or optical pattern via the indicator 150 when the display device(s) 140 receive an indication that the event is active. As described above, because the event indicator annunciation information is included in an internet protocol suite (e.g., a TCP/IP) message, such as a MODBUS event log message, the display device(s) 140 may be enabled to receive and extract the event indicator annunciation information for one or more events.

As shown by reference number 325, the display device(s) 140 may display an event indicator via the indicator 150, in accordance with the event indicator annunciation information, if the event is active. For example, the display device(s) 140 may receive (e.g., from the controller 120) an indication that an event is active. The display device(s) 140 may determine event indicator annunciation information associated with the event (e.g., based on the message(s) received from the controller 120, as described above in connection with reference number 320) indicating a color and/or optical pattern to be displayed via the indicator 150. The display device(s) 140 may display the color and/or optical pattern via the indicator 150 in accordance with the event indicator annunciation information.

As indicated above, FIG. 3 is provided as an example. Other examples may differ from what is described with regard to FIG. 3.

Figure 4:
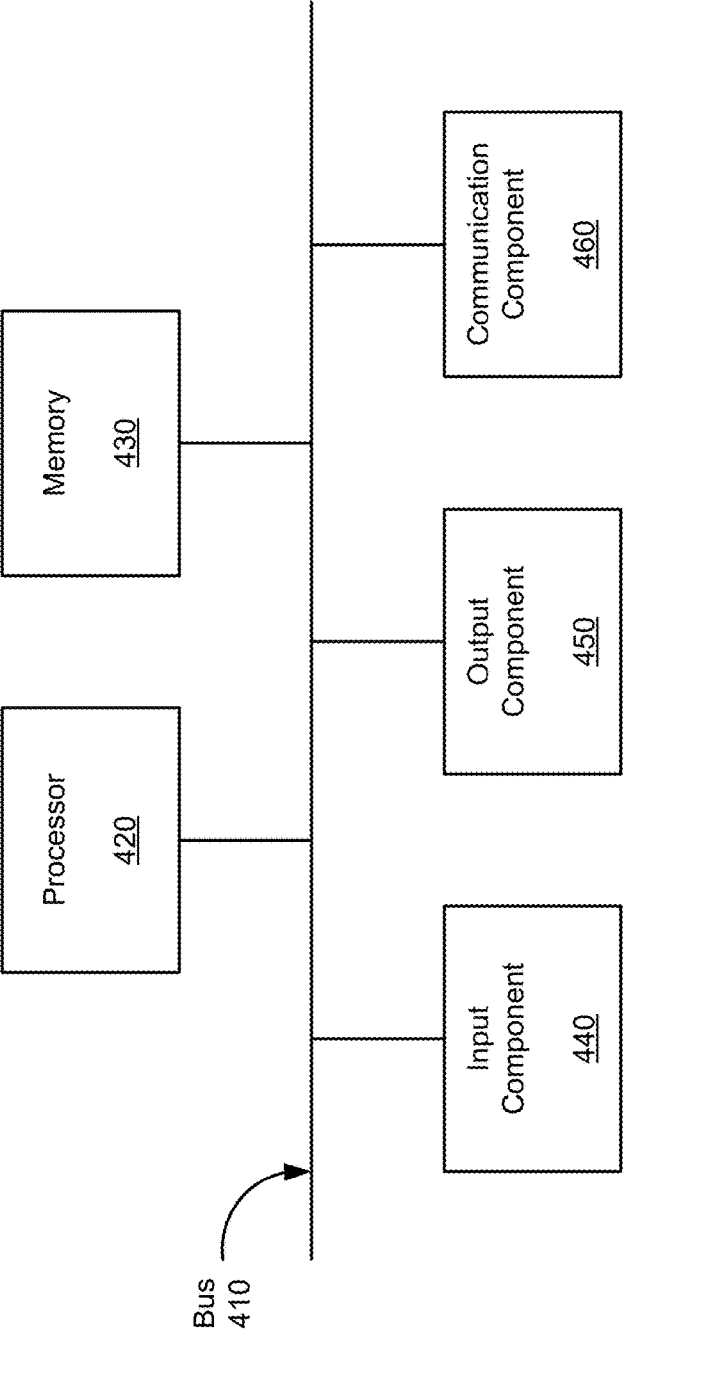
FIG. 4 is a diagram of example components of a device described herein.

FIG. 4 is a diagram of example components of a device 400, which may correspond to the controller 120, the CM 114, the display device 140, the service device 165, and/or other devices described herein. In some implementations, controller 120, the CM 114, the display device 140, the service device 165, and/or other devices described herein, include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include RAM, ROM, a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with controller signaling of flexible event indicator annunciation described herein. In some implementations, one or more process blocks of FIG. 5 may be performed by a controller (e.g., the controller 120). In some implementations, one or more process blocks of FIG. 5 may be performed by another device or a group of devices separate from or including the controller, such as the CM 114, the display device 140, a sensor 160, a device 112, and/or the service device 165, among other examples. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving event information associated with one or more events associated with the system, wherein the event information indicates flexible event indicator annunciation information for respective events of the one or more events (block 510). For example, the controller may receive event information associated with one or more events associated with the system, wherein the event information indicates flexible event indicator annunciation information for respective events of the one or more events, as described above. An event indicator may be associated with a region of a display of the display device.

Receiving the event information may include receiving a user input indicating the flexible event indicator annunciation information associated with the event. Receiving the event information may include receiving, from a device associated with the system and the event, an indication of the flexible event indicator annunciation information associated with the event via a CAN message.

As further shown in FIG. 5, process 500 may include configuring the event information for the one or more events (block 520). For example, the controller may configure the event information for the one or more events, as described above.

As further shown in FIG. 5, process 500 may include transmitting, to a display device, an event information message, associated with an event of the one or more events, that includes flexible event indicator annunciation information, associated with the event, to be displayed by the display device when the event is active (block 530). For example, the controller may transmit, to a display device, an event information message, associated with an event of the one or more events, that includes flexible event indicator annunciation information, associated with the event, to be displayed by the display device when the event is active, as described above.

The event information message may be associated with an internet protocol suite communication protocol for PLCs, such as a TCP/IP protocol, and/or the MODBUS protocol. The event information message may be associated with an internet protocol suite communication protocol message format that is defined for providing the event information. The flexible event indicator annunciation information may be included in a register of the event information message format that is associated with indicating a status flag or occurrence count. The flexible event indicator annunciation information may be capable of changing over time.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The controller 120 may cause an event indicator (e.g., an optical indicator which may be referred to as a lamp) to be displayed via the display device 140 to notify an operator that the event is active. For example, the controller 120 may cause a region of the display 145 of the display device 140 to display a color indicating a severity of the event (e.g., to notify the operator and enable the operator to take appropriate action(s) based on the event being active). However, in some cases, the display device 140 may be separate from the controller 120. For example, third party displays or other devices may be used to display the various event indicators. Therefore, an internal signaling protocol may not be used to transmit annunciation information for the various events to the display device 140. Moreover, the annunciation information may be dynamic and/or change over time. However, the controller 120 may be unable to communicate the annunciation information for the various events to the separate display device because no signaling protocol is defined for indicating the annunciation information.

Some implementations described herein enable controller signaling of flexible event indicator annunciation information. For example, the controller 120 may transmit, to a display device 140, event indicator annunciation information for an event using an IP suit (e.g., a TCP/IP) message that is defined for conveying event information. For example, the controller 120 may transmit the event indicator annunciation information in a MODBUS event log message. As a result, any devices, such as the display device 140, that is capable of communicating via the IP suit (e.g., the TCP/IP) protocol may be enabled to receive and extract flexible or dynamic event indicator annunciation information for one or more events. For example, the controller 120 may be enabled to receive, obtain, and/or aggregate event indicator annunciation information via different communication protocols, in different formats or structures, and/or from different devices and configure the event indicator annunciation information in a format that can be received and/or interpreted by the display device 140 (e.g., the MODBUS event log message format). Therefore, the controller 120 may be enabled to transmit an indication of event indicator annunciation information (e.g., a lamp status or a lamp color) for an event to a display device 140. Additionally, the controller 120 may be enabled to transmit event indicator annunciation information that changes over time to the display device 140. This may enable systems controlled by the controller 120 to be associated with different display devices 140 (e.g., that are separately configured or installed from the controller 120).

Additionally, signaling the event indicator annunciation information in accordance with a diagnostic message format defined by a first protocol (e.g., the SAE J1939 protocol) in an event information message that uses a format defined by a second protocol (e.g., the MODBUS protocol) may simplify the signaling of flexible and/or dynamic event indicator annunciation information because the controller 120 is enabled to re-use the event indicator annunciation information format or definitions in messages using a different protocol that can be used to communicate with the display device 140.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a controller that is associated with controlling a system, event information, associated with one or more events associated with the system, via a controller area network (CAN) communication protocol, wherein the event information indicates first event indicator annunciation information associated with the one or more events;
   receiving, from a service device different from the system and after receiving the event information, a user input indicating second event indicator annunciation information associated with an event of the one or more events, wherein each of the first event indicator annunciation information and the second event indicator annunciation information indicates a different manner in which an event indicator is to be displayed when the event is active;
   configuring, by the controller and after receiving the user input, the second event indicator annunciation information for the event; and
   transmitting, by the controller, to a display device physically separate from the system and the service device, and based on configuring the second event indicator annunciation information, a MODBUS protocol event log message, associated with the event, that includes the second event indicator annunciation information to be displayed by the display device when the event is active.

2. The method of claim 1,
   wherein an event indicator is associated with a region of a display of the display device.

3. The method of claim 1,
   wherein the MODBUS protocol event log message is associated with an internet protocol suite communication protocol for programmable logic controllers (PLC).

4. The method of claim 1,
   wherein the MODBUS protocol event log message includes a register associated with indicating a status flag or occurrence count associated with the second event indicator annunciation information.

5. The method of claim 1,
   wherein the second event indicator annunciation information is capable of changing over time.

6. The method of claim 1,
   wherein transmitting the MODBUS protocol event log message comprises:
   detecting, based on configuring the event information, a triggering event associated with the event; and
   transmitting, based on detecting the triggering event, the MODBUS protocol event log message.

7. The method of claim 1, wherein the event information is transmitted in a diagnostic message 31 (DM31) formatted in accordance with a SAE J1939 protocol.

8. The method of claim 1, wherein the second event indicator annunciation information included in the MODBUS protocol event log message is associated with at least one of a lamp state, a lamp color, or a severity associated with the event, extracted from the event information.

9. A controller associated with controlling a system, comprising:
   one or more memories; and
   one or more processors configured to:
      receive event information associated with one or more events associated with the system, wherein the event information indicates first event indicator annunciation information associated with the one or more events, wherein the first event indicator annunciation information indicates an event indicator color;
      receive, from a service device different from the system and after receiving the event information, a user input indicating second event indicator annunciation information associated with an event of the one or more events, wherein each of the first event indicator annunciation information and the second event indicator annunciation information indicates a different manner in which an event indicator is to be displayed when the event is active;
      configure, after receiving the user input, diagnostic messaging information for the one or more events including the second event indicator annunciation information for the event; and
      transmit, to a display device different from the system and the service device and based on configuring the diagnostic messaging information, a MODBUS protocol event log message including a register encoding the second event indicator annunciation information for the event, wherein the register includes a first bit indicating that a first color is to be displayed by the event indicator when the event is active, a second bit indicating that a second color is to be displayed by the event indicator when the event is active, and a third bit indicating that no color or a default color is to be displayed by the event indicator when the event is active.

10. The controller of claim 9,
wherein the MODBUS protocol event log message is transmitted in accordance with a diagnostic message 31 (DM31) format defined by an SAE J1939 protocol.

11. The controller of claim 9,
wherein the register is part of one or more unused fields of the MODBUS protocol event log message.

12. The controller of claim 9,
wherein the one or more processors, to transmit the MODBUS protocol event log message, are configured to:
    transmit the MODBUS protocol event log message based on at least one of:
        a periodic schedule, or
        detecting a trigger event.

13. The controller of claim 9,
wherein the first event indicator annunciation information is associated with first diagnostic event indicator annunciation information for the one or more events, and
wherein the second event indicator annunciation information is associated with second diagnostic event indicator annunciation information for the event, the second diagnostic event indicator annunciation information being different from the first diagnostic event indicator annunciation information.

14. The controller of claim 9,
wherein the display device includes at least one of:
    a human-machine interface,
    a supervisory control and data acquisition (SCADA) device, or
    a building management system (BMS) display interface.

15. The controller of claim 9, wherein the register is a particular register, of a plurality of registers of the MODBUS protocol event log message, dedicated for the second event indicator annunciation information.

16. A system, comprising:
one or more system devices; and
a controller for controlling the one or more system devices, wherein the controller is configured to:

receive, from at least one of the one or more system devices, event information associated with one or more events associated with the system via a controller area network (CAN) communication protocol, wherein the event information indicates first event indicator annunciation information associated with the one or more events;
    receive, from a service device different from the one or more system devices, a user input indicating second event indicator annunciation information associated with an event of the one or more events, wherein each of the first event indicator annunciation information and the second event indicator annunciation information indicates a different manner in which an event indicator is to be displayed when the event is active;
    configure, after receiving the user input, diagnostic messaging information for the one or more events including the second event indicator annunciation information for the event; and
    transmit, to a display device, physically separate from the one or more system devices and the service device, and based on configuring the diagnostic messaging information, a MODBUS protocol event log message, associated with the event, that includes the second event indicator annunciation information, associated with the event, to be displayed by the display device when the event is active.

17. The system of claim 16,
wherein the second event indicator annunciation information indicates information as defined for a diagnostic message (DM) format.

18. The system of claim 16,
wherein the system is a generator set (genset) system.

19. The system of claim 16,
wherein, to transmit the MODBUS protocol event log message, the controller is configured to:
    detect, based on configuring the event information, a triggering event associated with the event; and
    transmit based on detecting the triggering event, the MODBUS protocol event log message.

20. The system of claim 16, wherein the MODBUS protocol event log message includes a register associated with indicating a status flag or an occurrence count, and wherein the second event indicator annunciation information is encoded in one or more unused bits of the register.

* * * * *